June 15, 1965  F. P. DAVEY ETAL  3,188,924
METHOD AND APPARATUS FOR THE MANUFACTURE OF SMOKE FILTERS
Filed May 16, 1961  6 Sheets-Sheet 5

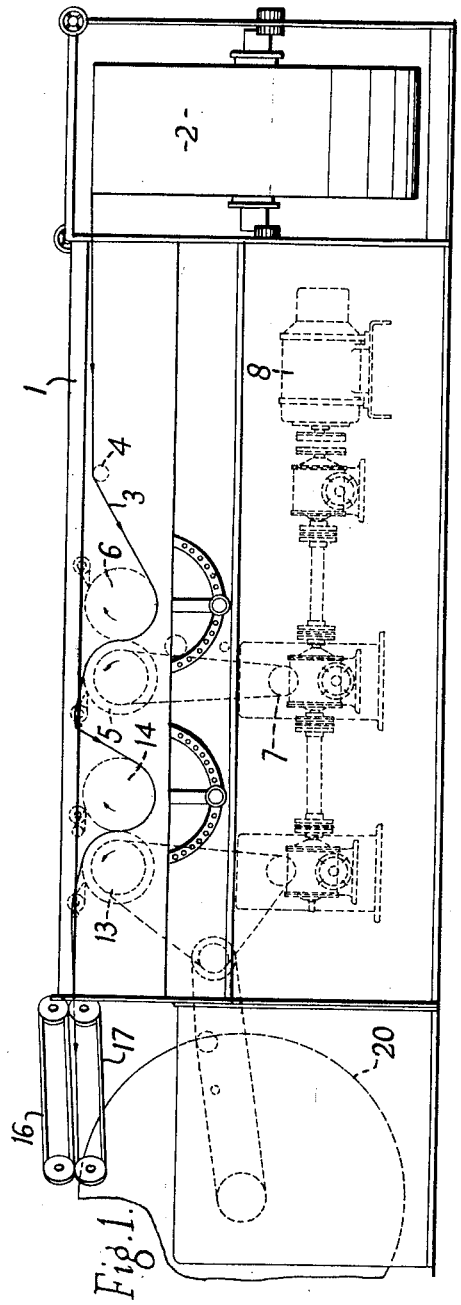

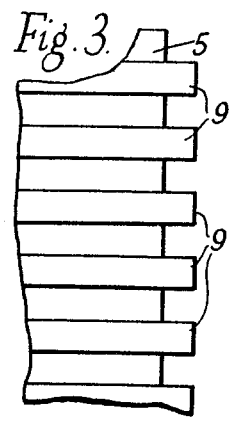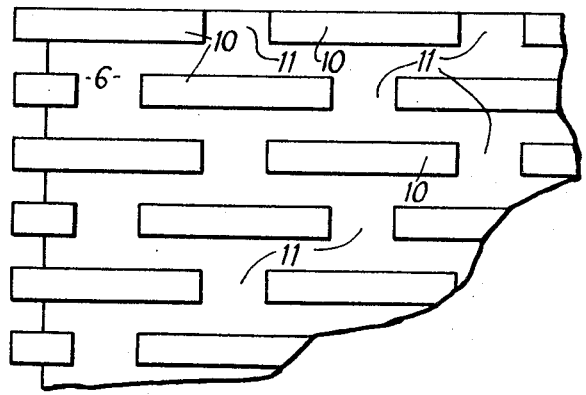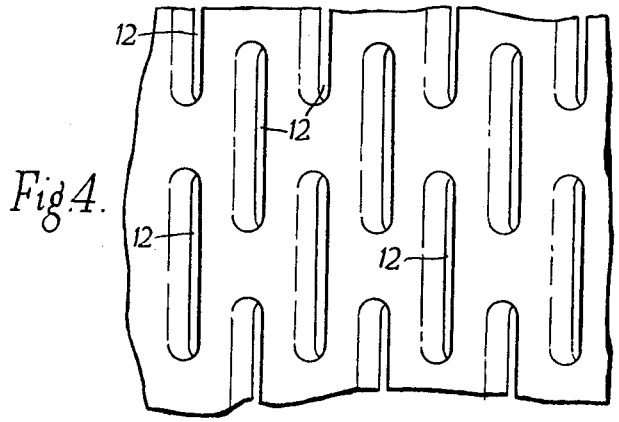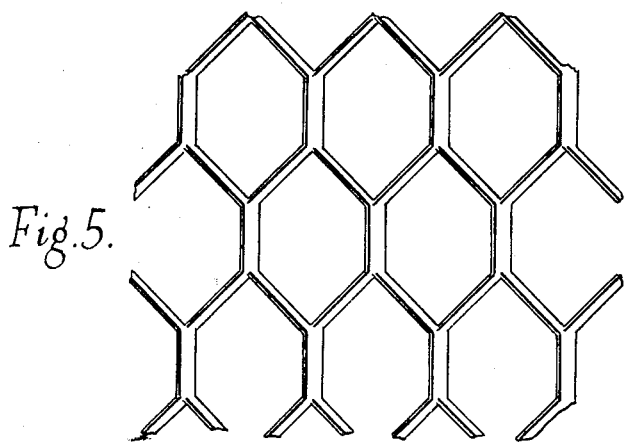

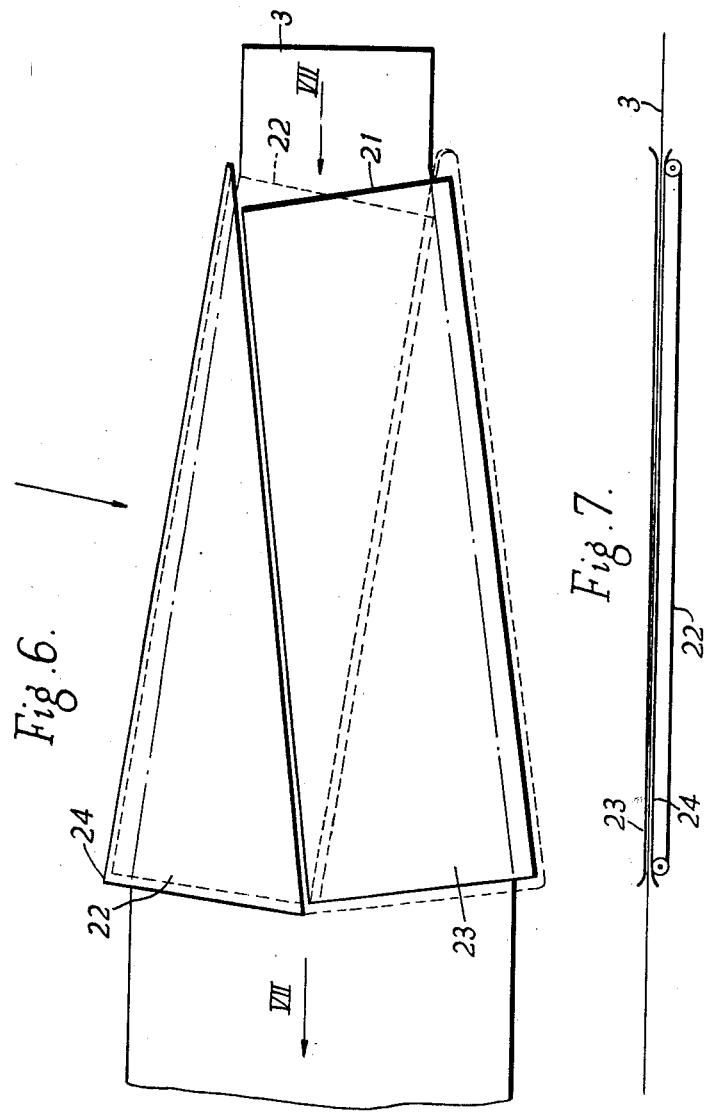

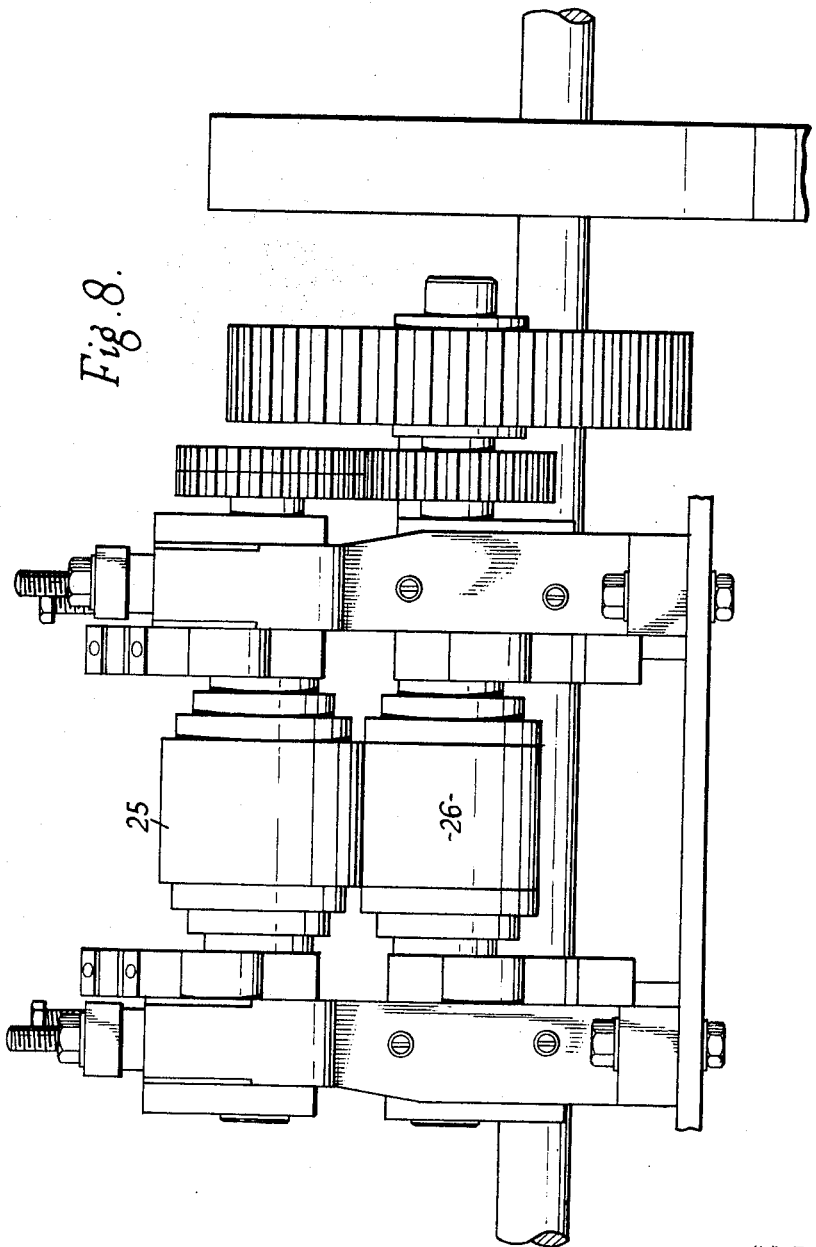

INVENTORS
Frederick P. Davey
Brian Smith
BY
Kenyon, Palmer,
Stewart & Estabrook
ATTORNEYS June 15, 1965  F. P. DAVEY ETAL  3,188,924
METHOD AND APPARATUS FOR THE MANUFACTURE OF SMOKE FILTERS
Filed May 16, 1961  6 Sheets-Sheet 6

INVENTORS
Frederick P. Davey
Brian Smith
BY
Kenyon, Palmer,
Stewart & Estabrook
ATTORNEYS United States Patent Office 3,188,924
Patented June 15, 1965

3,188,924
METHOD AND APPARATUS FOR THE MANUFACTURE OF SMOKE FILTERS
Frederick Peter Davey and Brian Smith, London, England, assignors to Cigarette Components Limited, London, England, a British company
Filed May 16, 1961, Ser. No. 110,577
Claims priority, application Great Britain, Jan. 12, 1960, 1,151/60
11 Claims. (Cl. 93—1)

The present invention relates to an improved method for the production of reticulated webs starting from thin flexible sheet or strip material, the webs presenting the characteristics of softness, drapability, handle and the like normally associated with fabrics.

The starting materials may be unitary sheets or strips of fibrous material such as paper, fibre fleeces, cellulose wadding, thin sheet plastic or films and the like or laminated sheets consisting for example of fibrous material such as paper combined with a surface layer of another material such as thin aluminum or other metal foil.

The method of producing a reticulated web according to the invention consists in submitting sheet or strip material to a slitting operation to form an array of elongated slits arranged in substantially parallel rows with the slits in adjacent rows in staggered relationship such that the ends of a slit in one row overlap adjacent ends of two adjacent slits in an adjacent row, and thereafter stretching the slit sheet or strip in the direction transverse to the rows of slits.

By stretching the sheet or strip after slitting, the elongated slits are caused to open to form holes of an approximate hexagonal contour resulting in a web exhibiting a honeycomb pattern with parts of the boundaries of the hexagons twisted from the plane of the starting sheet or strip so that a reticulated web is produced of greater overall thickness than that of the starting sheet or strip and with non-planar faces on both sides of the median plane of the original sheet or strip.

The stretching of the slit sheet or strip is usually carried out so that a web of the desired open reticulated structure is the result after some degree of recovery of the stretched material has taken place.

In some cases however steps are taken to stabilise the material of the web in a condition of required stretch or elongation.

The slitting and stretching and in some instances the stabilising may be carried out in sequential steps in a single continuous production operation.

Alternatively the sheet material may be slit as described above and then rolled for storage, the stretching being carried out subsequently when the reticulated web is required for use.

The invention further consists in apparatus for use in the production of the reticulated web material.

The reticulated web material is suitable for use in fulfilling a wide variety of purposes. For example it may be folded, gathered or bundled to form filter bodies particularly though not exclusively for use as tobacco smoke filters.

Again, it may be used for purposes for which fabrics have hitherto normally been employed.

Thus for example a laminated reticulated web of paper faced with metal foil e.g. aluminum is well adapted for use as a low cost ornamental curtaining material by virtue of its drapability, softness, brightness and reflectance. Using a laminated material having an aluminum foil layer on its surface the aluminum may be anodised to produce enhanced ornamental effects. Such reticulated laminated material may also be used for the production of garments or parts thereof and it is found to possess good heat insulating properties such that it may be used for the production of garments for use under conditions of high or low temperature.

The invention is illustrated by way of example in the accompanying drawings in which:

FIG. 1 is a view in side elevation of one form of machine for slitting and stretching the sheet or strip material, the formed slits in this case extending in the direction longitudinally of a continuous sheet or strip.

FIG. 2 is a plan view of the machine of FIG. 1.

FIG. 3 is an enlarged view of parts of a pair of slitting rolls.

FIG. 4 is an enlarged diagrammatic view showing a part of a sheet or strip and an array of formed slits.

FIG. 5 illustrates a part of the slit sheet or strip after stretching.

FIG. 6 is a view of an alternative form of the part of the apparatus of FIGS. 1 and 2 for effecting the operation of stretching the slit sheet or strip.

FIG. 7 is a view in sectional elevation taken on the line VII—VII of FIG. 6.

FIG. 8 shows a part of an alternative form of machine making use of slitting rolls which produce an array of slits extending transversely of a continuous sheet or strip.

Figure 9:
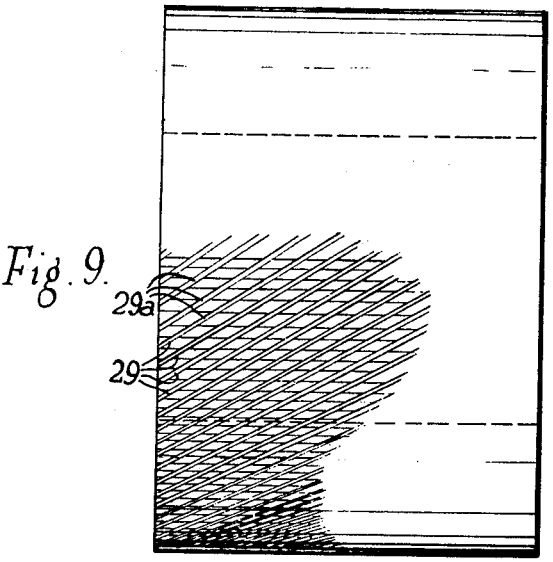
FIGS. 9, 9a and 10 are enlarged views illustrating the forms of co-operating slitting rolls which may be used in the apparatus of FIG. 8.

Referring to the drawings, FIGS. 1 and 2 show a machine comprising a frame structure 1 in which may be mounted a roll 2 of a starting unitary or laminated sheet or strip.

The starting strip 3 from the roll 2 is fed as indicated by the arrows in FIG. 1 over guide rollers 4 and between a pair of co-operating slitting rollers 5 and 6 of similar effective diameter geared together by gearing (not shown) and driven at similar speed through any convenient form of transmission such as chains and sprockets 7 from an electric motor 8.

One of the slitting rollers 5 is provided with a plurality of uniformly spaced continuous circumferential ridges 9 (FIG. 3) and the other roller 6 with circumferential ridges 10 (FIG. 3) regularly interrupted as shown at 11, the ridges 10 of roller 6 being in register with for entry into the spaces between the continuous ridges 9 of roller 5, the interruptions 11 in the ridges 10 in the roller 6 being of short length as compared with a part of a ridge 10 between two interruptions 11 and the interruptions 11 in adjacent ridges being staggered so that an interruption 11 in one ridge 10 lies midway between two adjacent interruptions 11 in an adjacent ridge.

Thus as the sheet or strip 3 is moved between the rollers 5 and 6 entry of each part of an interrupted ridge 10 of roller 6 between two continuous ridges 9 of roller 5 effects a localised distortion or straining and slitting of the sheet or strip so that an array of slits 12 are formed in the sheet or strip, the slits 12 being formed in rows extending longitudinally of the sheet or strip and with the slits in adjacent rows regularly staggered so that the two ends of a slit 12 in one row overlap the adjacent ends of two slits 12 in an adjoining row in the manner shown on an exaggerated scale in FIG. 4.

In some cases the continuous ridges 9 may be arranged to co-operate at one side edge thereof with one side edge of the parts of an adjacent interrupted ridge 10 to slit the sheet or strip by shearing instead of by local distortion or straining.

In a typical case operating with a starting sheet or strip of paper, the rollers used to produce an array of slits as in FIG. 4 have an outside diameter of 9", circumferential ridges .010" wide spaced .0075" apart. The interruptions in the ridges of the second roller each occupy .040" of the circumference and they are spaced .110" apart along each ridge and the staggering of the interruptions in adjacent ridges is achieved with a spacing of .035" between the adjacent ends of any two adjacent interruptions, one in each ridge.

The machine of FIG. 1 includes a further pair of rollers 13, 14 having meshing shallow circumferential ribs or corrugations 15 (FIG. 2) and the slit sheet 3 is led from the slitting rollers 5 and 6 between the rollers 13 and 14 so that the slit sheet or strip 3 is corrugated longitudinally and some degree of preliminary transverse stretch thereby imparted to the sheet or strip to open the slits 12.

The effective peripheral speeds of the corrugating rollers 13 and 14 may be the same as that of the slitting rollers 5 and 6 and the axes of all these rollers 5 and 6 and 13 and 14 may conveniently be disposed in a common horizontal plane as shown in FIG. 1.

The machine shown in FIGS. 1 and 2 includes further means for effecting transverse stretching of the slit sheet or strip.

The means shown for this purpose comprises two pairs of endless belts 16, 17 and 18, 19, the two belts of each pair being superposed and the pairs being mounted with one end spaced by less than the width of the slit and corrugated sheet or strip 3 emerging from the rollers 13, 14, and diverging away from one another as shown in FIG. 2. The edges of the slit sheet or strip 3 from the rollers 13, 14, enter between the belts and frictional engagement between the slit sheet or strip and the belts effects a widening or transverse stretching of the slit sheet or strip. Thus a reticulated web is formed exhibiting hexagonal apertures of the general form shown in FIG. 5, parts of the boundaries of the hexagons being bent from the plane of the original sheet or strip so that a web is produced of greater thickness than that of the starting sheet or strip with non-planar surfaces on both sides of its median plane.

The formed reticulated web may be wound in the slit and stretched condition on to a storage roll 20 (FIG. 1) until required for use or it may be taken direct to further stations for effecting any required further operations on the web. Thus for example when the web is intended to be used in the making of tobacco smoke filters the web may be taken direct to a garniture or other form of folding, bundling or gathering device to be transformed into filter bodies, commonly in the form of paper-encased pervious cylindrical rods.

In FIGS. 6 and 7 there is illustrated an alternative means for effecting transverse stretching of the slit strip or sheet 3.

In this case two wide endless belts 21 and 22 are employed mounted in horizontal planes one above and one below the slit sheet or strip 3 emerging from the corrugating rolls 13, 14. These belts overlie one another at the entry end and diverge from the centre line of the moving slit sheet or strip 3 until the other ends are transversely displaced from above one another, so that two non-overlapping triangular belt areas exist one at each side of the overlapping parts of the belts 21 and 22.

Upper and lower triangular pressure plates 23, 24 are provided, one above and one below the travelling slit sheet or strip 3 to hold the latter in effective contact with the working runs of the upper and lower triangular non-overlapping belt areas, to effect the transverse stretching of the slit sheet or strip 3.

As an example, with longitudinally extending slits as described above a transverse stretch of up to approximately double the width of the starting sheet or strip is found to be adequate for the production of a reticulated web suitable to be transformed into tobacco smoke filters.

In an alternative form a reticulated web may be produced with the slits in the staggered array extending transversely across the direction of feeding of the sheet or strip of starting material.

For this purpose a machine may be employed having a pair of slitting rollers 25 and 26 (FIGS. 8–14) one provided with a plurality of axially directed uniformly spaced and continuous ridges and the other with a plurality of substantially similar axially directed uniformly spaced but discontinuous ridges, the ridges of the two rollers being capable of meshing with one another.

Again the gaps in the interrupted ridges are in staggered relationship as between adjacent interrupted ridges so that a paper or other sheet or strip passed between the rollers 25 and 26 is provided with an array of slits in rows substantially similar in disposition to that described with reference to FIG. 4 but with the individual rows of slits extending transversely across the direction of movement of the sheet or strip.

The rollers 25 and 26 are geared together for rotation in accurate synchronism and the slit sheet or strip emerging from the rollers is passed between a further pair of rollers (not shown) arranged for rotation at a speed higher than that of the rollers 25 and 26 to stretch the slit sheet or strip in the direction of its travel i.e. longitudinally to form the reticulated web. The stretching rollers are preferably of a yielding material or provided with a surface layer of a yielding material such as flexible foamed rubber or flexible foamed plastic so that stretching of the slit sheet or strip is effected with a minimum of crushing thereof. Longitudinal stretching to increase the length up to approximately double has been found appropriate for producing a reticulated web intended to be converted into tobacco smoke filters. The transversely slit and longitudinally stretched web again, may be rolled in stretched condition for storage and future use or it may be fed direct to further processing stations such as to a smoke-filter rod forming garniture or equivalent folding, bunching or gathering device.

Figure 9A:
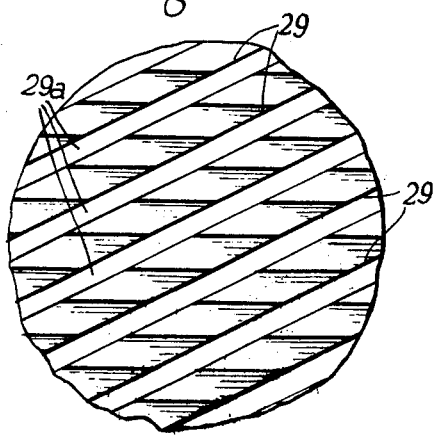
Figure 10:
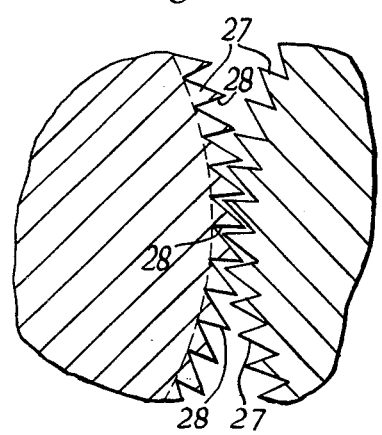
Figure 11:
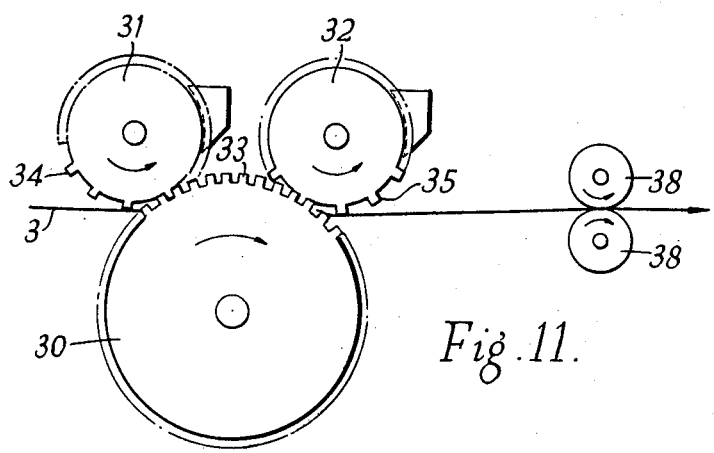
FIGS. 11, 12, 13 and 14 are diagrammatic illustrations showing still another method and apparatus for producing the required array of staggered slits in a continuous sheet or strip.
Figure 12:
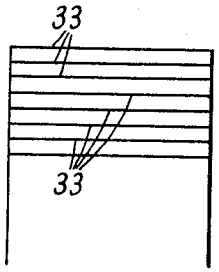

The ridges of the rollers 25 and 26 may be of sawtooth form in section as shown on an enlarged scale at 27 in FIG. 10, with one face 28 of the teeth in a plane which is a radial plane containing the axis of the roller and it has been found convenient to form the interruptions 29 (FIGS. 9 and 9a) in the ridges of one of the rollers by traversing the roller whilst rotating at an appropriate speed, beneath a milling cutter so that grooves 29a are cut at an inclination across the ridges 27 to form the interruptions.

With rollers constructed as above described the transversely directed slits are produced in the sheet or strip by shearing engagement between the saw-tooth ridges of the two rollers.

In FIGS. 11 to 14 there is shown a further method and apparatus for producing an array of transversely directed slits in the sheet or strip.

Figure 13:
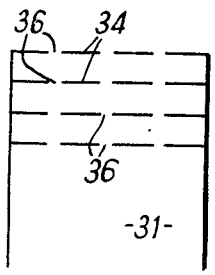
Figure 14:
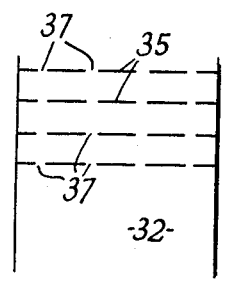

In this case three rollers 30, 31 and 32 are employed the roller 30 being provided with axially directed uniformly spaced continuous ridges 33 and the remaining rollers 31 and 32 having axially directed uniformly spaced but interrupted ridges 34 and 35, the spacing of the ridges 34 and 35 on the rollers 31 and 32 being double that of the spacing of the continuous ridges on roller 30, and the interruptions 36 in the ridges 34 of the roller 31 being staggered with reference to the interruptions 37 in the ridges 35 of the roller 32 (FIGS. 13 and 14).

The rollers 30, 31 and 32 are mounted for rotation in accurate synchronism and so that the interrupted ridges 34 of the roller 31 co-operate with alternate continuous ridges 33 of the roller 30 to produce alternate required rows of slits in the sheet or strip and the interrupted ridges 35 of the roller 32 subsequently co-operate with the other continuous ridges 33 of the roller 30 to produce the remainder of the required rows of slits in the sheet or strip, the slit sheet or strip emerging from the rollers 30, 31, 32 being thereafter stretched by passing it between further rollers 38 rotating with higher peripheral speed than rollers 30, 31, 32.

Figure 15:
FIG. 15 is a sectional view of a paper-aluminum foil laminated sheet or strip which may be used as the starting material the foil being secured to the paper by means of an adhesive.

As previously stated the starting material may be a single or unitary sheet or strip or it may be laminated sheet or strip and in FIG. 15 there is illustrated a suitable laminated sheet or strip comprising a paper base layer 39 and a foil of aluminum 40 fixed to the paper base layer 39 by means of an adhesive 41. Such laminated material is well adapted for use in the production of the reticulated web of the present invention and the product is suitable for use for a wide variety of purposes calling for softness and drapability as well as attractive appearance.

In some cases it may be desirable to set the slit and stretched web in the stretched condition prior to further use.

For this purpose the starting sheet or strip may be provided with a coating of a thermoplastic resin material, the web after stretching being subjected to heat to flux the resin.

Alternatively a setting agent such as a solution of ethyl cellulose in alcohol may be sprayed on to the slit and stretched web.

In some cases the slit and stretched web may be combined with other flat web material e.g. of unstressed dimensions similar to that of the slit and stretched web to provide a laminated web with the hexagonal holes closed on one side.

In the production of tobacco smoke filters the slit and stretched web may in some cases with advantage be interleaved with finely porous filter materials so as to provide a filter in which the fluid being filtered is given continous access to the surface of the finely porous material, this being of particular advantage where the latter, as is often the case, lacks sufficient inherent rigidity to preserve an adequate separation between adjacent plies when such finely porous material is used alone.

This application is a continuation-in-part of our application Serial No. 81,608/61, filed January 9, 1961, now abandoned.

We claim:

1. A method of producing a smoke filter from a sheet or strip of thin highly flexible material, said method comprising:
   forming an array of elongated slits in the material, said slits being arranged in substantially parallel rows with the slits in adjacent rows in staggered relationship, the ends of a slit in one row overlapping adjacent ends of two adjacent slits in an adjacent row;
   thereafter stretching the thus slit material in a direction transverse to the rows of slits;
   and finally gathering and compressing the thus slit and stretched material into rod form.

2. A method as defined by claim 1 in which the stretching operation is preformed by engaging the moving slit sheet of strip between adjacent surfaces of endless belts disposed at a divergent inclination to the direction of feed movement of the sheet or strip to stretch the slit sheet or strip transversely.

3. A method producing a smoke filter from a sheet or strip of thin highly flexible material, said method comprising:
   moving the material continuously and simultaneously slitting the material to form an array of elongated slits in rows substantially parallel to the direction of movement of the material, the slits in adjacent rows being staggered, and the ends of a slit in one row overlapping adjacent ends of two adjacent slits in an adjacent row;
   next stretching the slit material in a direction transverse to the rows of slits;
   and thereafter gathering and compressing the slit and stretched material into rod form.

4. A method of producing a smoke filter from a starting sheet or strip of thin highly flexible material, said method comprising:
   moving the material continuously and simultaneously slitting the material to form an array of elongated slits in substantially parallel rows transverse to the direction of movement of the material, and with the slits in adjacent rows in staggered relationship, the ends of a slit in one row overlapping adjacent ends of two adjacent slits in an adjacent row;
   next stretching the slit material in a direction transverse to the parallel rows of slits;
   and thereafter gathering and compressing the slit and stretched material into rod form.

5. Apparatus for producing a smoke filter from a starting sheet of thin highly flexible material, said apparatus comprising:
   means for converting the starting sheet into a reticulated web including a pair of co-operating slitting rollers, one provided with a plurality of uniformly spaced continuous circumferential ridges and the other with uniformly spaced and interrupted circumferential ridges in register with the spaces between the ridges of the first roller and with the interruptions in adjacent ridges of the second roller in staggered relationship such that an interruption in one of said ridges lies between the ends of a ridge part between two adjacent interruptions in an adjacent ridge;
   means for stretching the sheet after its passage between said pair of slitting rollers in the direction axially of said rollers;
   and means for gathering and compressing the reticulated web into the form of a rod.

6. Apparatus for producing a smoke filter from a starting sheet of thin highly flexible material, said apparatus comprising:
   means for converting the starting sheet or strip into a reticulated web including co-operating slitting rollers, one provided with a plurality of uniformly spaced axially directed continuous ridges for co-operation with another roller provided with a plurality of uniformly spaced axially directed but interrupted ridges with the interruptions in adjacent ridges of the second mentioned roller in staggered relation such that an interruption in one of said ridges of said second mentioned roller lies between the ends of a ridge part between two adjacent interruptions in an adjacent ridge of said second mentioned roller;
   means for stretching the sheet after its passage between said co-operating rollers in a direction transverse to the axes of said co-operating rollers;
   and means for gathering and compressing the reticulated web into the form of a rod.

7. Apparatus as claimed in claim 6 wherein the ridges of the slitting rollers are of saw-tooth form in section with one face of the teeth in radial planes containing the axis of the respective roller.

8. Apparatus for forming a reticulated web from a starting sheet or strip of thin highly flexible material, said apparatus comprising:
   a plurality of co-operating slitting rollers including a first roller with uniformly spaced continuous ridges and a plurality of further rollers with uniformly spaced but interrupted ridges, the interruptions in the ridges of one of said further rollers being staggered with reference to the interruptions in the ridges of another of said further rollers and the spacing of the interrupted ridges of each of said further rollers being a multiple of the spacing of the continuous ridges of said first roller;

means for mounting all of said rollers for synchronous rotation so that slitting co-operation takes place between a continuous ridge of said first roller and an interrupted ridge of said one of said further rollers, followed in timed sequence by slitting by co-operation between a further continuous ridge of said first roller and an interrupted ridge of said another of said further rollers.

9. Apparatus for producing a smoke filter from a starting sheet of thin highly flexible material, said apparatus comprising:

means for converting the starting sheet into a reticulated web including a pair of cooperating slitting rollers, one provided with a plurality of uniformly spaced continuous circumferential ridges and the other with uniformly spaced and interrupted circumferential ridges in register with the spaces between the ridges of the first roller and with the interruptions in adjacent ridges of the second roller in staggered relationship such that an interruption in one of said ridges lies between the ends of a ridge part between two adjacent interruptions in an adjacent ridge;

means for corrugating the sheet after its passage between said pair of slitting rollers, said corrugations extending in a general direction transverse to the axes of the cooperating slitting rollers;

means for stretching the slit and corrugated sheet in the direction axially of said cooperating slitting rollers;

and means for gathering and compressing the slit and stretched sheet into the form of a rod.

10. Apparatus for producing a smoke filter from a starting sheet of thin highly flexible material, said apparatus comprising:

means for converting the starting sheet or strip into a reticulated web including cooperating slitting rollers, one provided with a plurality of uniformly spaced axially directed continuous ridges for cooperating with another roller provided with a plurality of uniformly spaced axially directed but interrupted ridges with the interruptions in adjacent ridges of the second mentioned roller in staggered relation such that an interruption in one of said ridges of said second mentioned roller lies between the ends of a ridge part between two adjacent interruptions in an adjacent ridge of said second mentioned roller;

means for corrugating the sheet after its passage between said cooperating slitting rollers, said corrugations extending in the general direction parallel to the axes of the cooperating slitting rollers;

means for stretching the slit and corrugated sheet in the direction transverse to the axes of said cooperating slitting rollers;

and means for gathering and compressing the slit and stretched sheet into the form of a rod.

11. A method of producing a smoke filter from a sheet or strip of thin highly flexible material, said method comprising:

moving the material continuously and simultaneously slitting the material to form an array of elongated slits in substantially parallel rows, the slits in adjacent rows being staggered and the ends of a slit in one row overlapping adjacent ends of two adjacent slits in an adjacent row;

forming corrugations in the slit material, said corrugations extending in the general direction of the rows of slits;

next stretching the slit and corrugated materials in a direction transverse to the rows of slits and the corrugations;

and thereafter gathering and compressing the slit and stretched material into rod form.

References Cited by the Examiner

UNITED STATES PATENTS

| | | | |
|---|---|---|---|
| 547,952 | 10/95 | Hayes | 29—6.1 |
| 698,448 | 4/02 | Caldwell | 29—6.1 |
| 711,416 | 10/02 | Bradford | 29—6.1 |
| 799,892 | 9/03 | Curtis | 29—6.1 |
| 2,046,621 | 7/36 | Gibson | 29—6.1 |
| 2,294,478 | 9/42 | Norris et al. | 93—1 |
| 2,537,764 | 1/51 | Hunzicker et al. | 93—1 |
| 2,588,859 | 3/52 | Lumbard | 93—1 |
| 2,611,298 | 9/52 | Rowe | 93—1 |
| 2,670,314 | 2/54 | Ungar | 93—1 |
| 2,849,932 | 9/58 | Marogg | 93—1 |
| 2,916,039 | 12/59 | Muller | 131—208 |
| 2,931,364 | 4/60 | Mueller | 131—208 |
| 2,933,122 | 4/60 | Christman | 93—1 |

FOREIGN PATENTS 363,676  1932  Great Britain.

FRANK E. BAILEY, *Primary Examiner*.

ABRAHAM STONE, *Examiner*.